United States Patent
Clauson et al.

(10) Patent No.: US 10,683,812 B2
(45) Date of Patent: Jun. 16, 2020

(54) DUAL VALVE SYSTEM WITH MECHANICAL LINKAGE

(71) Applicant: United Technologies Corporation, Farmington, CT (US)

(72) Inventors: Jesse W. Clauson, Agawam, MA (US); Matthew C. Waddell, Brimfield, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/104,520

(22) Filed: Aug. 17, 2018

(65) Prior Publication Data

US 2020/0056552 A1 Feb. 20, 2020

(51) Int. Cl.
*F02D 9/10* (2006.01)
*F16K 1/22* (2006.01)
*F02D 9/02* (2006.01)
*F02B 29/04* (2006.01)

(52) U.S. Cl.
CPC ............ *F02D 9/1065* (2013.01); *F16K 1/221* (2013.01); *F16K 1/223* (2013.01); *F02B 29/0418* (2013.01); *F02D 2009/0254* (2013.01)

(58) Field of Classification Search
CPC ........ F16K 1/221; F16K 1/223; F02D 9/1065; F02D 2009/0254; F02B 29/0418; Y10T 137/2516; Y10T 137/2652; Y10T 137/87442–87491; Y10T 137/87161;
(Continued)

(56) References Cited

U.S. PATENT DOCUMENTS

| 324,762 | A | * | 8/1885 | Fleischer | ........... G05D 16/0661 137/505.39 |
| 1,303,939 | A | * | 5/1919 | Moellmer | ................ G10K 5/00 116/138 |

(Continued)

FOREIGN PATENT DOCUMENTS

| DE | 3901264 | | 8/1989 |
| GB | 2524985 | A * | 10/2015 |

(Continued)

OTHER PUBLICATIONS

EP Application No. 19192087.5 Extended EP Search Report dated Jan. 31, 2020, 7 pages.

*Primary Examiner* — William M McCalister
(74) *Attorney, Agent, or Firm* — Cantor Colburn LLP (57) ABSTRACT

An aspect includes a dual valve system that includes a first valve body and a first valve disc operably disposed within the first valve body, where the first valve disc has a first disc geometry. The dual valve system also includes a second valve body and a second valve disc operably disposed within the second valve body, where the second valve disc has a second disc geometry. The dual valve system further includes a mechanical linkage operably coupled to the first valve disc and the second valve disc, where the second disc geometry differs from the first disc geometry such that opening of a first flow area between the first valve body and the first valve disc occurs prior to opening of a second flow area between the second valve body and the second valve disc responsive to movement of the mechanical linkage.

14 Claims, 6 Drawing Sheets

(58) Field of Classification Search
CPC ..... Y10T 137/86911; Y10T 137/86919; Y10T 137/86928–8704
USPC ... 137/99, 118.02, 601.05–601.12, 595, 627, 137/627.5, 628–630.22
See application file for complete search history.

(56) References Cited

U.S. PATENT DOCUMENTS

| | | | | |
|---|---|---|---|---|
| 1,436,145 A * | 11/1922 | Birkenmaier | ......... | B05B 7/1209 239/528 |
| 2,002,761 A * | 5/1935 | Armstrong | ............ | F16K 31/524 137/601.12 |
| 2,107,990 A * | 2/1938 | Leibing | ............... | F02D 9/00 137/481 |
| 2,477,237 A * | 7/1949 | Carr | ............... | F16K 1/34 137/596.1 |
| 2,578,478 A * | 12/1951 | Janes | ............... | F02C 7/047 60/785 |
| 2,734,529 A * | 2/1956 | Harrison | ............. | F16K 11/0655 137/628 |
| 2,790,631 A * | 4/1957 | Carlson | ............... | F02M 11/02 261/23.2 |
| 2,912,231 A * | 11/1959 | Goemann | ............... | F24D 5/00 165/216 |
| 3,259,376 A * | 7/1966 | Baer | ............... | F02M 11/02 261/23.2 |
| 3,346,013 A * | 10/1967 | Reichow | ............... | F24F 11/74 137/628 |
| 3,680,597 A * | 8/1972 | Obermaier | ............. | F16K 11/16 137/630.19 |
| 3,768,729 A * | 10/1973 | Dean, Jr. | ............... | F24F 13/04 236/13 |
| 3,897,524 A * | 7/1975 | Freismuth | ............. | F02M 11/02 261/23.2 |
| 4,249,382 A * | 2/1981 | Evans | ............... | F02B 37/007 123/568.2 |
| 4,312,381 A * | 1/1982 | Ratner | ............... | F16K 11/0525 137/595 |
| 4,747,942 A * | 5/1988 | Strauss | ............... | B03B 5/24 137/595 |
| 4,817,374 A * | 4/1989 | Kitta | ............... | F01N 1/165 137/595 |
| 4,870,990 A * | 10/1989 | Bierling | ................ | F02M 11/02 137/595 |
| 5,427,141 A * | 6/1995 | Ohtsubo | ................ | F02D 9/06 137/595 |
| 5,601,114 A * | 2/1997 | Hummel | ........ | B60K 15/03519 137/588 |
| 6,263,917 B1 * | 7/2001 | Evans | ................ | F02D 9/101 137/595 |
| 6,568,428 B2 * | 5/2003 | Pecci | ................ | F16K 27/003 137/595 |
| 7,121,088 B2 * | 10/2006 | Lavin | ................ | F01N 1/166 60/324 |
| 7,267,139 B2 * | 9/2007 | Blomquist | ............ | F02D 9/1065 137/607 |
| 7,302,969 B2 * | 12/2007 | Hasegawa | ............ | F16K 11/0525 137/625.46 |
| 7,543,563 B2 * | 6/2009 | Dunn | ................ | F02D 9/1065 123/336 |
| 7,814,748 B2 * | 10/2010 | Nydam | ................ | F02D 9/1095 137/595 |
| 8,342,206 B2 * | 1/2013 | Gierszewski | ........ | F02D 9/1055 137/601.16 |
| 8,561,645 B2 * | 10/2013 | Leroux | ................ | F02M 26/06 137/637.1 |
| 8,684,033 B2 * | 4/2014 | Albert | ................ | F02B 29/0418 137/601.11 |
| 9,354,638 B2 * | 5/2016 | Rebreanu | ................ | F16K 1/00 |
| 10,267,200 B2 * | 4/2019 | Janssens | ................ | F28F 13/06 |
| 2004/0118464 A1 * | 6/2004 | Chang | ................ | C23C 16/4412 137/630 |
| 2005/0150559 A1 * | 7/2005 | Kwon | ................ | F16K 3/32 137/630.12 |
| 2011/0302917 A1 * | 12/2011 | Styles | ................ | F02B 37/025 60/602 |
| 2017/0114657 A1 | 4/2017 | Hussain et al. | | |

FOREIGN PATENT DOCUMENTS

WO    2015155528    10/2015
WO    2016160760    10/2016

* cited by examiner

DUAL VALVE SYSTEM WITH MECHANICAL LINKAGE

BACKGROUND

The subject matter disclosed herein generally relates to flow control systems and, more particularly, to a method and apparatus for a dual valve flow split with a mechanical linkage.

Pneumatic systems, such as airflow control systems on an aircraft, can use multiple valves with multiple actuators to control delivery of an airflow for various purposes. Components receiving the airflow may have different requirements for timing or conditions under which the airflow should be received. Using a dedicated actuator for each valve to be controlled can support a wide range of control sequences between multiple valves; however, each actuator adds weight and complexity to the overall system.

BRIEF DESCRIPTION

According to one embodiment, a dual valve system includes a first valve body and a first valve disc operably disposed within the first valve body, where the first valve disc has a first disc geometry. The dual valve system also includes a second valve body and a second valve disc operably disposed within the second valve body, where the second valve disc has a second disc geometry. The dual valve system further includes a mechanical linkage operably coupled to the first valve disc and the second valve disc, where the second disc geometry differs from the first disc geometry such that opening of a first flow area between the first valve body and the first valve disc occurs prior to opening of a second flow area between the second valve body and the second valve disc responsive to movement of the mechanical linkage.

In addition to one or more of the features described above or below, or as an alternative, further embodiments may include where the first valve body and the second valve body are arranged substantially parallel to each other.

In addition to one or more of the features described above or below, or as an alternative, further embodiments may include where the first valve body and the first valve disc form a first butterfly valve, and the second valve body and the second valve disc form a second butterfly valve.

In addition to one or more of the features described above or below, or as an alternative, further embodiments may include an actuator operably coupled to the mechanical linkage.

In addition to one or more of the features described above or below, or as an alternative, further embodiments may include where the actuator is configured to drive rotation of the first valve disc directly and drive rotation of the second valve disc through the mechanical linkage.

In addition to one or more of the features described above or below, or as an alternative, further embodiments may include where the first disc geometry includes a substantially uniform thickness of the first valve disc, and the second disc geometry includes a tapered thickness increasing radially outward from a pivot point of the second valve disc.

In addition to one or more of the features described above or below, or as an alternative, further embodiments may include where a first outer edge of the first valve disc forming the first flow area has a first thickness that is less than a second thickness of a second outer edge of the second valve disc forming the second flow area.

According to another embodiment, a pneumatic system for a gas turbine engine includes a first pneumatic tube configured to receive a first airflow from the gas turbine engine, a first valve body coupled to the first pneumatic tube, and a first valve disc operably disposed within the first valve body, the first valve disc having a first disc geometry. The pneumatic system also includes a second pneumatic tube configured to receive a second airflow from the gas turbine engine, a second valve body coupled to the second pneumatic tube, and a second valve disc operably disposed within the second valve body, the second valve disc having a second disc geometry. The pneumatic system further includes a mechanical linkage operably coupled to the first valve disc and the second valve disc, where the second disc geometry differs from the first disc geometry such that opening of a first flow area between the first valve body and the first valve disc occurs prior to opening of a second flow area between the second valve body and the second valve disc responsive to movement of the mechanical linkage.

According to another embodiment, a method of operating a dual valve system includes driving a first valve disc having a first disc geometry to rotate using an actuator and translating a rotational force of the actuator through a mechanical linkage operably coupled to the first valve disc and a second valve disc. The second valve disc has a second disc geometry that differs from the first disc geometry such that opening of a first flow area proximate to the first valve disc occurs prior to opening of a second flow area proximate to the second valve disc responsive to the rotational force.

In addition to one or more of the features described above or below, or as an alternative, further embodiments may include where the first valve disc operably disposed within a first valve body, the second valve disc is operably disposed within a second valve body, and the first valve body and the second valve body are arranged substantially parallel to each other.

A technical effect of the apparatus, systems and methods is achieved by providing a dual valve system with a mechanical linkage as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
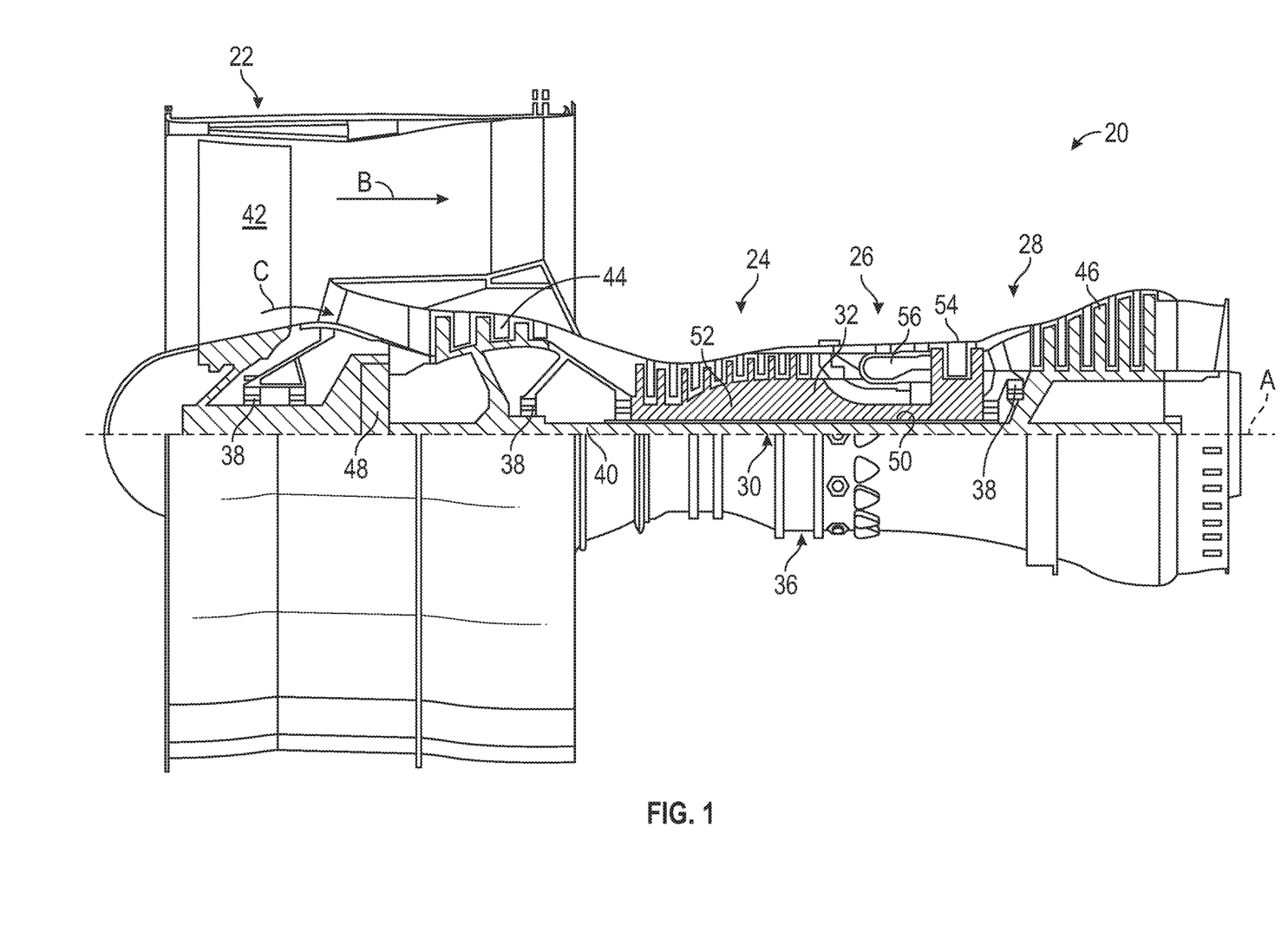
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
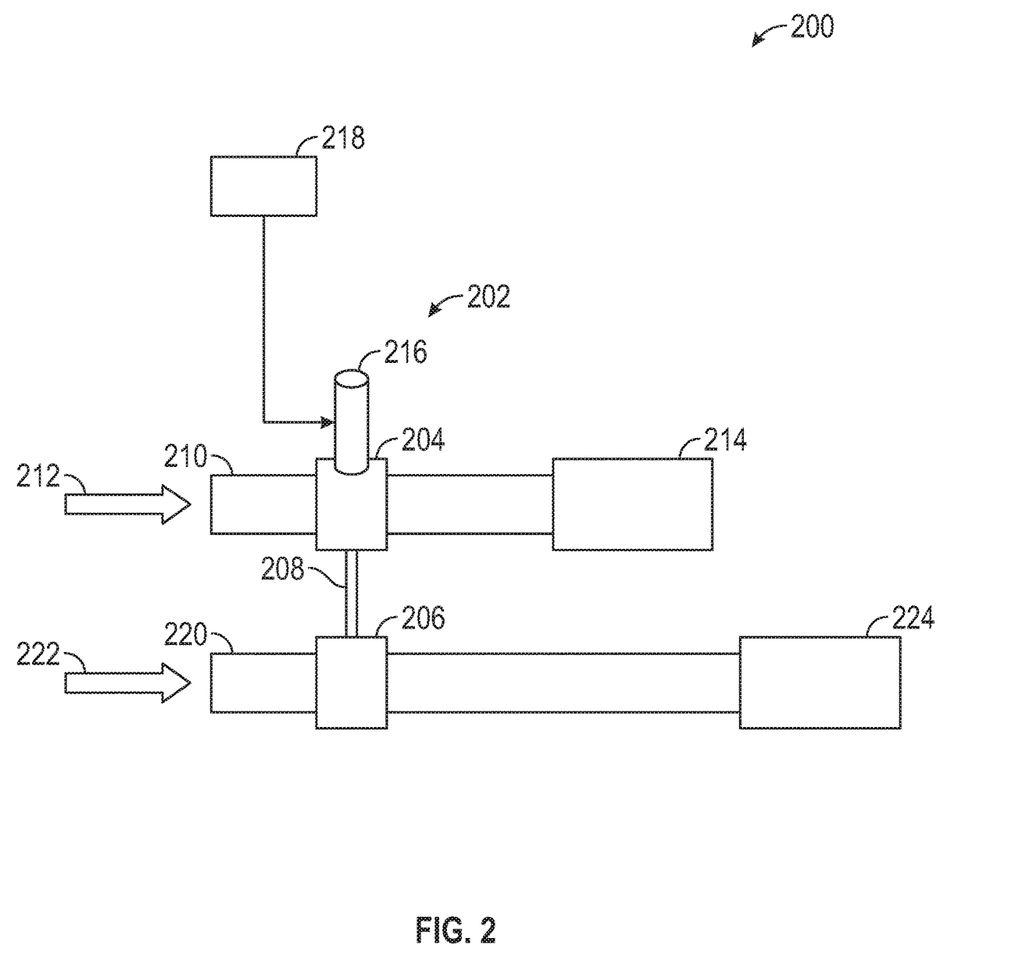
FIG. 2 is a schematic diagram of a pneumatic system including a dual valve system, in accordance with an embodiment of the disclosure.

FIG. 2 illustrates a pneumatic system 200 that includes a dual valve system 202 with a first valve 204 operably coupled to a second valve 206 by a mechanical linkage 208. The first valve 204 is fluidly coupled to a first pneumatic tube 210 configured to receive a first airflow 212 from an air source, such as an airflow of the gas turbine engine 20 of FIG. 1. The first valve 204 selectively enables a first airflow use 214 to receive all, a portion, or substantially none of the first airflow 212 through the first pneumatic tube 210 responsive to an actuator 216. Similarly, the second valve 206 is fluidly coupled to a second pneumatic tube 220 configured to receive a second airflow 222 from an air source, such as an airflow of the gas turbine engine 20 of FIG. 1. The second valve 206 selectively enables a second airflow use 224 to receive all, a portion, or substantially none of the second airflow 222 through the second pneumatic tube 220 responsive to the actuator 216. In the example of FIG. 2, the first valve 204 can be directly driven by the actuator 216, while the second valve 206 is driven through the mechanical linkage 208 responsive to a rotational force of the actuator 216.

A controller 218 can control operation of the actuator 216, where the controller 218 may also control other system aspects, such as controlling operation of the gas turbine engine 20 of FIG. 1. In embodiments, the controller 218 can include a processing system, a memory system, an input/output interface, and other such systems known in the art.

As one example configuration, the pneumatic system 200 can supply the first airflow 212 and the second airflow 222 for active clearance control of the gas turbine engine 20 of FIG. 1. Active clearance control can reduce blade tip to shroud clearance within the gas turbine engine 20 by regulating thermal expansion of engine structures through controlled delivery of cooling air to targeted locations. The first valve 204 and the second valve 206 may each have different characteristics to establish a specific flow split relationship between the first airflow use 214 and the second airflow use 224. For instance, the first airflow use 214 can provide cooling air to a portion of the high pressure turbine 54 of FIG. 1, and the second airflow use 224 can provide cooling air to a portion of the low pressure turbine 46 of FIG. 1. In embodiments, the first airflow 212 and the second airflow 222 may originate from a common portion of the gas turbine engine 20, such as an engine bleed of the compressor section 24 and/or bypass air from the fan section 22 of FIG. 1. Using a flow split relationship that allows cooling air of the first airflow 212 to reach the first airflow use 214 prior to allowing cooling air of the second airflow 222 to reach the second airflow use 224 may increase performance and TSFC of the gas turbine engine 20. The mechanical linkage 208 can enable a single instance of the actuator 216 to control the state of the first valve 204 and the second valve 206, while delayed opening of the second valve 206 relative to the first valve 204 may be achieved, for example, by geometric differences between components within the first valve 204 and the second valve 206, as further described herein.

Figure 3:
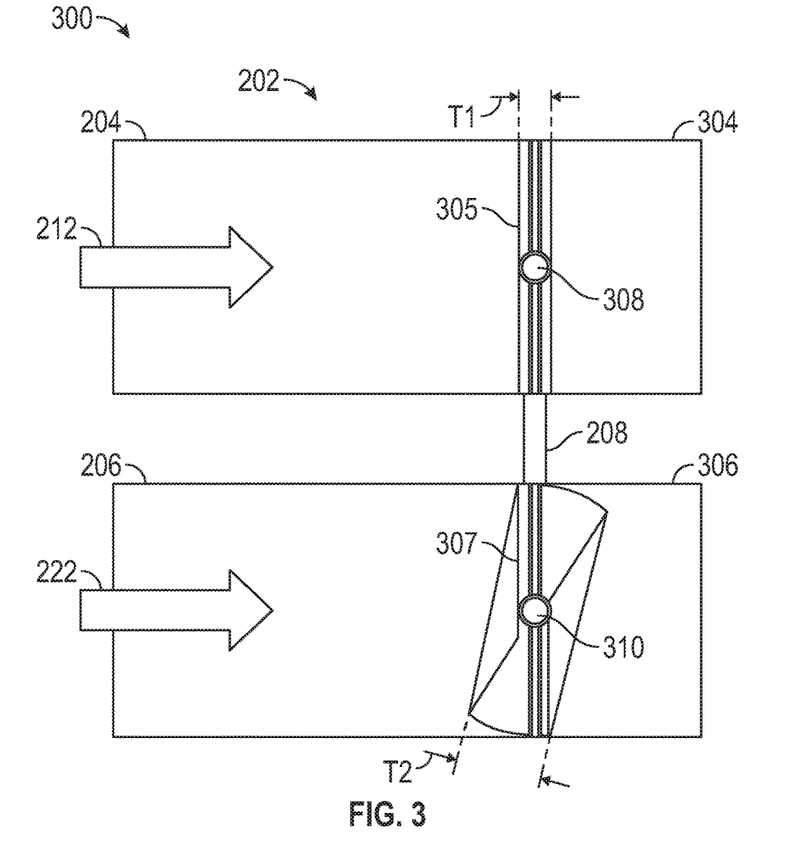
FIG. 3 is a schematic diagram of a dual valve system in a first state, in accordance with an embodiment of the disclosure.

FIG. 3 is a schematic diagram of the dual valve system 202 in greater detail in a first state 300 according to an embodiment. The first valve 204 and the second valve 206 may each be a butterfly valve (e.g., a first butterfly valve and a second butterfly valve). The first valve 204 can include a first valve body 304 and a first valve disc 305 operably disposed within the first valve body 304, where the first valve disc 305 has a first disc geometry. The second valve 206 can include a second valve body 306 and a second valve disc 307 operably disposed within the second valve body 306, where the second valve disc 307 has a second disc geometry. The mechanical linkage 208 can be operably coupled to the first valve disc 305 at a pivot point 308 and coupled to the second valve disc 307 at a pivot point 310. The first valve body 304 and the second valve body 306 can be arranged substantially parallel to each other. The second disc geometry can differ from the first disc geometry such that opening of a first flow area (e.g., first flow area 502, 702 of FIGS. 5 and 7) between the first valve body 304 and the first valve disc 305 occurs prior to opening of a second flow area (e.g., second flow area 504, 704 of FIGS. 5 and 7) between the second valve body 306 and the second valve disc 307 responsive to movement of the mechanical linkage 208. For instance, the first disc geometry may include a substantially uniform thickness T1 of the first valve disc 305, and the second disc geometry may include a tapered thickness T2 increasing radially outward from the pivot point 310 of the second valve disc 307. The second valve disc 307 may have a partially spherical outer diameter that assists in staggering the opening of the second flow area 504, 704 as compared to the first flow area 502, 702, as depicted in the examples of FIGS. 3-8. The difference in shape of the second valve disc 307 relative to the first valve disc 305 results in a delayed opening, such that a portion of the first airflow 212 can pass through the first valve 204 prior to a portion of the second airflow 222 being able to pass through the second valve 206 (neglecting nominal leakage).

Figure 4:
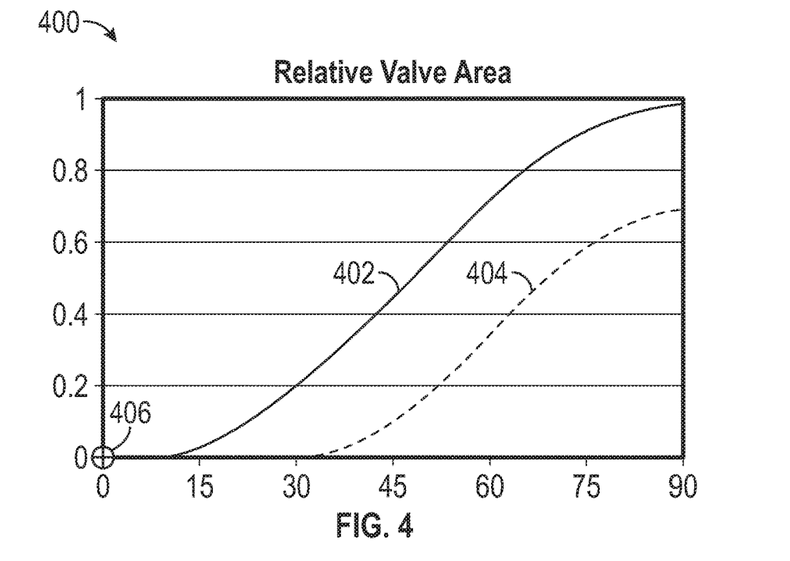
FIG. 4 is a plot of relative valve area, in accordance with an embodiment of the disclosure.

The first state 300 of the dual valve system 202 in FIG. 3 is depicted with both the first valve disc 305 and the second valve disc 307 fully closed at a position of zero degrees, as further illustrated in plot 400, where a first relative valve area 402 of the first valve 204 (e.g., scaled between 0 and 1) is depicted for a range of angles of the first valve disc 305 pivoting with respect to the first valve body 304 between zero and ninety degrees. The plot 400 also depicts an example of the delay of a second relative valve area 404 of the second valve 206 for a range of angles of the second valve disc 307 pivoting with respect to the second valve body 306 between zero and ninety degrees. A marker 406 on plot 400 indicates the state of the first valve 204 and the second valve 206 as configured in FIG. 3, e.g., both at a position of zero degrees and fully closed. It will be understood that the plot 400 is merely one example of a possible delay relationship between first valve 204 and the second valve 206, and other variations are contemplated.

Figure 5:
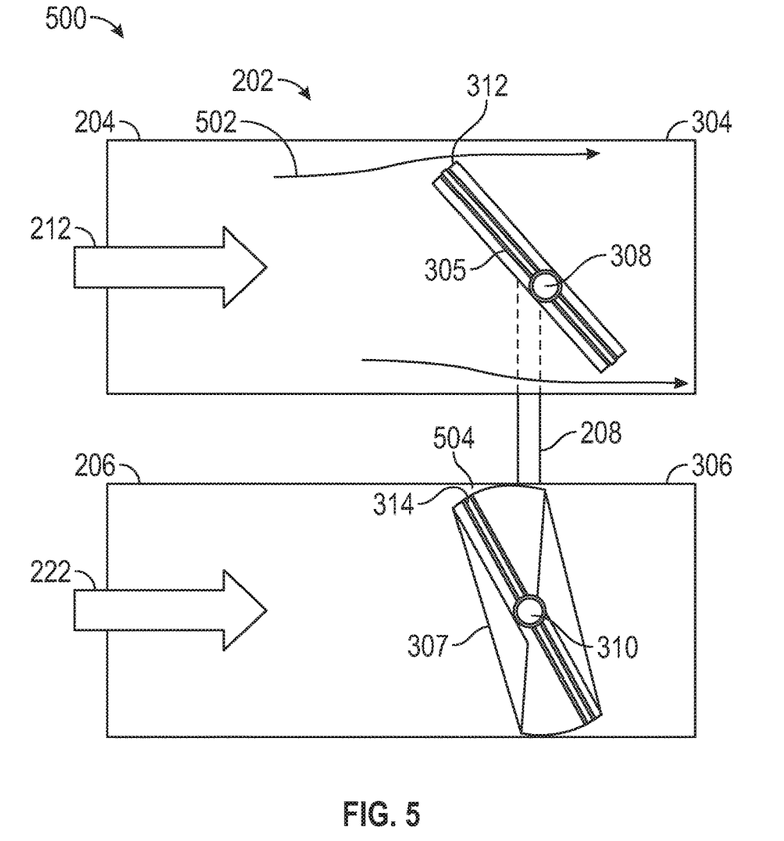
FIG. 5 is a schematic diagram of a dual valve system in a second state, in accordance with an embodiment of the disclosure.
Figure 6:
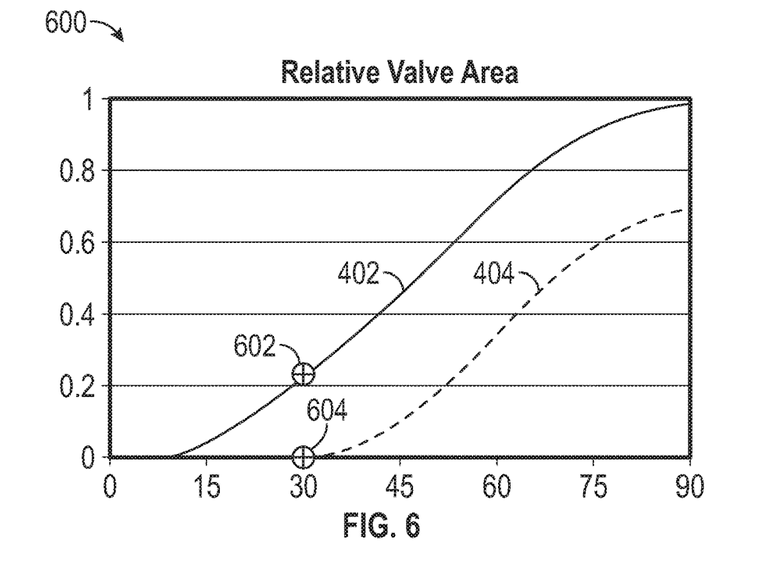
FIG. 6 is a plot of relative valve area, in accordance with an embodiment of the disclosure.

FIG. 5 depicts a second state 500 of the dual valve system 202 as another example, where the first valve disc 305 and the second valve disc 307 are both rotated to a position of about 30 degrees relative to the first valve body 304 and the second valve body 306 about pivot points 308, 310 respectively. A first outer edge 312 of the first valve disc 305 forms a first flow area 502 and has a first thickness T1 (FIG. 3) that is less than the second thickness T2 (FIG. 3) of a second outer edge 314 of the second valve disc 307 forming the second flow area 504. In an example plot 600 of FIG. 6, it can be seen that the second state 500 may result in a first relative valve area 402 of about 20% at marker 602, which allows a portion of the first airflow 212 to pass through the first valve 204 towards the first airflow use 214 of FIG. 2. However, the second valve 206 remains with a very small (near 0%) value for the second relative valve area 404 as seen at marker 604 on the example plot 600.

Figure 7:
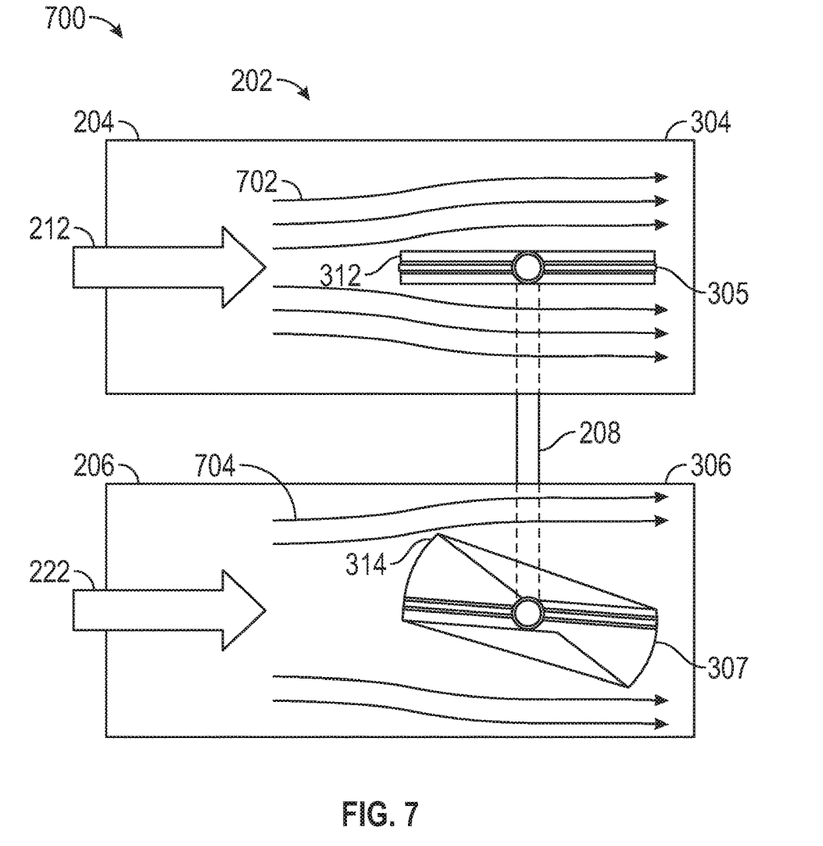
FIG. 7 is a schematic diagram of a dual valve system in a third state, in accordance with an embodiment of the disclosure.
Figure 8:
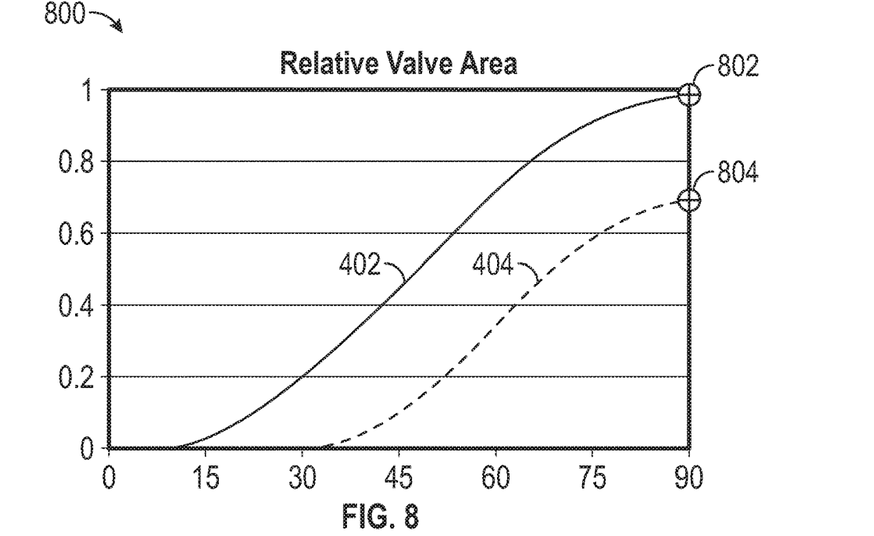
FIG. 8 is a plot of relative valve area, in accordance with an embodiment of the disclosure.

FIG. 7 depicts a third state 700 of the dual valve system 202 as another example, where the first valve disc 305 and the second valve disc 307 are both rotated to a position of about 90 degrees (e.g., maximum open) relative to the first valve body 304 and the second valve body 306 about pivot points 308, 310 respectively. The first outer edge 312 of the first valve disc 305 forms a first flow area 702, and the second outer edge 314 of the second valve disc 307 forms a second flow area 704. In an example plot 800 of FIG. 8, it can be seen that the third state 700 may result in a first relative valve area 402 of about 100% at marker 802, which allows the first airflow 212 to pass through the first valve 204 towards the first airflow use 214 of FIG. 2. The second valve 206 is also opened; however, the geometry of the second valve disc 307 relative to the first valve disc 305 that provided a delayed opening may also impede the second airflow 222, where the second relative valve area 404 as seen at marker 804 on the example plot 800 only reaches a peak flow area of about 70% and restricts flow towards the second airflow use 224 of FIG. 2. In some embodiments, the second valve body 306 can be larger than the first valve body 304 to accommodate the blockage effects of the second valve disc 307 at opened positions.

Figure 9:
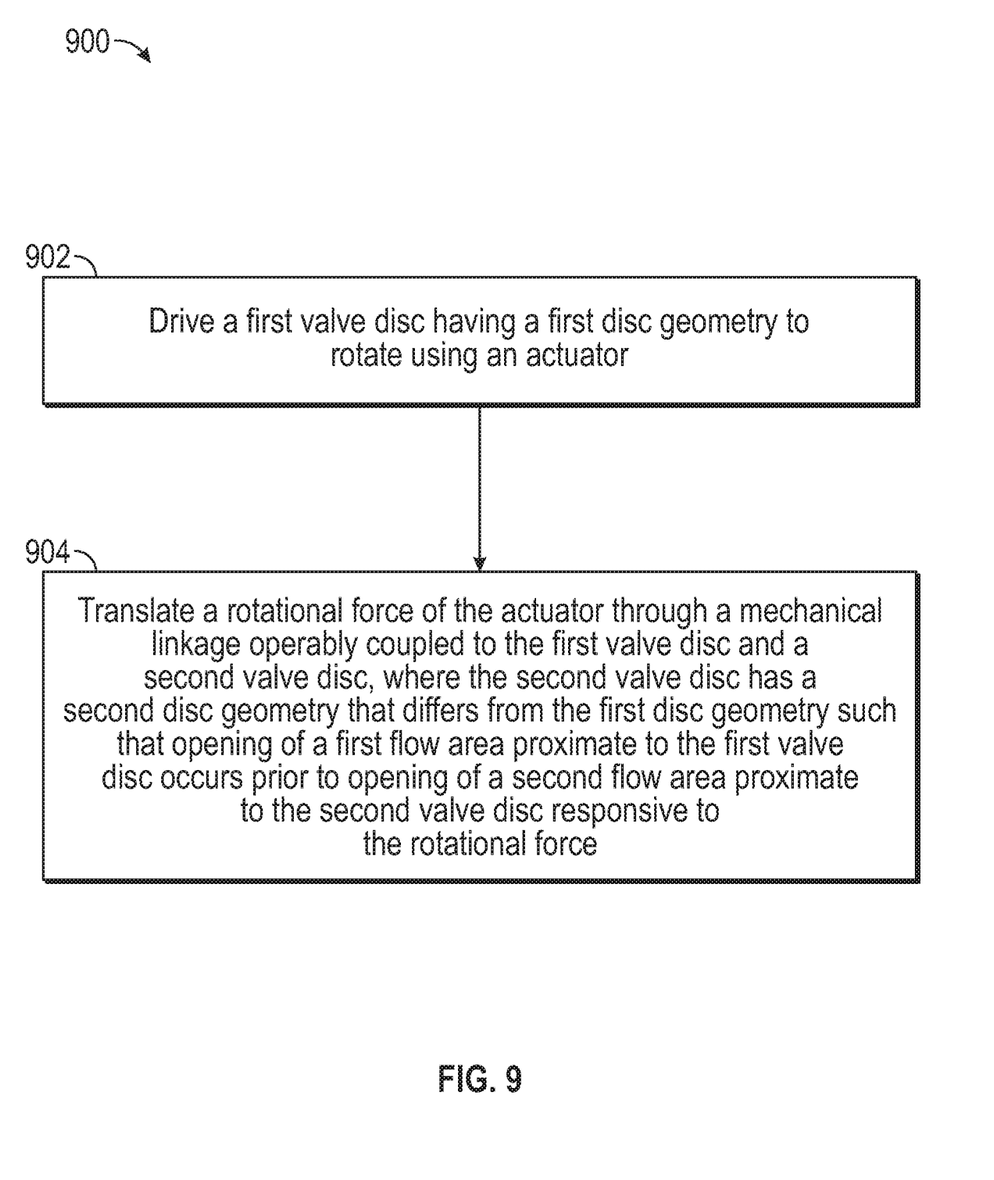
FIG. 9 is a flow chart illustrating a method, in accordance with an embodiment of the disclosure.

Referring now to FIG. 9 with continued reference to FIGS. 1-8, FIG. 9 is a flow chart illustrating a method 900 of operating the dual valve system 202, in accordance with an embodiment. The method 900 may be performed, for example, by the pneumatic system 200 of FIG. 2. For purposes of explanation, the method 900 is described primarily with respect to the pneumatic system 200; however, it will be understood that the method 900 can be performed on other configurations (not depicted).

At block 902, the first valve disc 305 having a first disc geometry is driven to rotate using the actuator 216. At block 904, a rotational force of the actuator 216 is translated through a mechanical linkage 208 operably coupled to the first valve disc 305 and a second valve disc 307, where the second valve disc 307 has a second disc geometry that differs from the first disc geometry such that opening of a first flow area 502, 702 proximate to the first valve disc 305 occurs prior to opening of a second flow area 504, 704 proximate to the second valve disc 307 responsive to the rotational force.

While the above description has described the flow process of FIG. 9 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A dual valve system comprising:
a first valve body;
a first valve disc operably disposed within the first valve body, the first valve disc having a first disc geometry;
a second valve body;
a second valve disc operably disposed within the second valve body, the second valve disc having a second disc geometry; and
a mechanical linkage operably coupled to the first valve disc and the second valve disc, wherein the second disc geometry differs from the first disc geometry such that opening of a first flow area between the first valve body and the first valve disc occurs prior to opening of a second flow area between the second valve body and the second valve disc responsive to movement of the mechanical linkage, wherein the first disc geometry comprises a uniform thickness of the first valve disc, and the second disc geometry comprises a tapered thickness increasing radially outward from a pivot point of the second valve disc, and wherein a first outer edge of the first valve disc forming the first flow area has a first thickness that is less than a second thickness of a second outer edge of the second valve disc forming the second flow area, and the second valve disc has a partially spherical outer diameter.

2. The dual valve system of claim 1, wherein the first valve body and the second valve body are arranged in parallel to each other.

3. The dual valve system of claim 1, wherein the first valve body and the first valve disc comprise a first butterfly valve, and the second valve body and the second valve disc comprise a second butterfly valve.

4. The dual valve system of claim 1, further comprising an actuator operably coupled to the mechanical linkage.

5. The dual valve system of claim 4, wherein the actuator is configured to drive rotation of the first valve disc directly and drive rotation of the second valve disc through the mechanical linkage.

6. A gas turbine engine comprising a pneumatic system, the pneumatic system comprising:
a first pneumatic tube configured to receive a first airflow from the gas turbine engine;
a first valve body coupled to the first pneumatic tube;
a first valve disc operably disposed within the first valve body, the first valve disc having a first disc geometry;
a second pneumatic tube configured to receive a second airflow from the gas turbine engine;
a second valve body coupled to the second pneumatic tube;
a second valve disc operably disposed within the second valve body, the second valve disc having a second disc geometry; and
a mechanical linkage operably coupled to the first valve disc and the second valve disc, wherein the second disc geometry differs from the first disc geometry such that opening of a first flow area between the first valve body and the first valve disc occurs prior to opening of a second flow area between the second valve body and the second valve disc responsive to movement of the mechanical linkage, wherein the first disc geometry comprises a uniform thickness of the first valve disc, and the second disc geometry comprises a tapered thickness increasing radially outward from a pivot point of the second valve disc, and wherein a first outer edge of the first valve disc forming the first flow area has a first thickness that is less than a second thickness of a second outer edge of the second valve disc forming the second flow area, and the second valve disc has a partially spherical outer diameter.

7. The gas turbine engine of claim 6, wherein the first valve body and the second valve body are arranged in parallel to each other.

8. The gas turbine engine of claim 6, wherein the first valve body and the first valve disc comprise a first butterfly valve, and the second valve body and the second valve disc comprise a second butterfly valve.

9. The gas turbine engine of claim 6, further comprising an actuator operably coupled to the mechanical linkage.

10. The gas turbine engine of claim 9, wherein the actuator is configured to drive rotation of the first valve disc directly and drive rotation of the second valve disc through the mechanical linkage.

11. A method of operating a dual valve system, the method comprising:
   driving a first valve disc having a first disc geometry to rotate using an actuator; and
   translating a rotational force of the actuator through a mechanical linkage operably coupled to the first valve disc and a second valve disc, wherein the second valve disc has a second disc geometry that differs from the first disc geometry such that opening of a first flow area proximate to the first valve disc occurs prior to opening of a second flow area proximate to the second valve disc responsive to the rotational force, wherein the first disc geometry comprises a uniform thickness of the first valve disc, and the second disc geometry comprises a tapered thickness increasing radially outward from a pivot point of the second valve disc, and wherein a first outer edge of the first valve disc forming the first flow area has a first thickness that is less than a second thickness of a second outer edge of the second valve disc forming the second flow area, and the second valve disc has a partially spherical outer diameter.

12. The method of claim 11, wherein the first valve disc operably disposed within a first valve body, the second valve disc is operably disposed within a second valve body, and the first valve body and the second valve body are arranged in parallel to each other.

13. The method of claim 12, wherein the first valve body and the first valve disc comprise a first butterfly valve, and the second valve body and the second valve disc comprise a second butterfly valve.

14. The method of claim 11, wherein the actuator is configured to drive rotation of the first valve disc directly and drive rotation of the second valve disc through the mechanical linkage.

* * * * *